United States Patent
Kolluri et al.

(10) Patent No.: US 8,326,869 B2
(45) Date of Patent: Dec. 4, 2012

(54) ANALYSIS OF OBJECT STRUCTURES SUCH AS BENEFITS AND PROVIDER CONTRACTS

(75) Inventors: Surya P Kolluri, Ellicott City, MD (US); Zhu-Song Mei, Chicago, IL (US); Dmitriy Feferman, Chicago, IL (US); Kevin P Lee, Cupertino, CA (US); Michael Irish, San Francisco, CA (US); Heather E Nelson, Chicago, IL (US); David Kil, Santa Clara, CA (US)

(73) Assignee: Accenture Global Services Limited, Dublin (IE)

( * ) Notice: Subject to any disclaimer, the term of this patent is extended or adjusted under 35 U.S.C. 154(b) by 79 days.

(21) Appl. No.: 12/888,718

(22) Filed: Sep. 23, 2010

(65) Prior Publication Data

US 2012/0078940 A1   Mar. 29, 2012

(51) Int. Cl.
*G06F 7/00* (2006.01)

(52) U.S. Cl. ........ 707/776; 707/778; 707/801; 707/809; 707/811

(58) Field of Classification Search ........... 707/736, 707/738, 740, 748, 749, 752, 755, 756, 776, 707/778, 801, 809, 811, E17.002, E17.014, 707/E17.046, E17.061, E17.089, E17.094, 707/E17.095, E17.122, E17.124, E17.125, 707/956, 999.001, 999.003, 999.007
See application file for complete search history.

(56) References Cited

U.S. PATENT DOCUMENTS

| | | | | |
|---|---|---|---|---|
| 6,912,538 | B2 * | 6/2005 | Stapel et al. | 1/1 |
| 7,216,129 | B2 * | 5/2007 | Aono et al. | 1/1 |
| 2006/0294049 | A1 * | 12/2006 | Sechrest et al. | 707/1 |
| 2007/0005589 | A1 | 1/2007 | Gollapudi | |
| 2007/0067281 | A1 | 3/2007 | Matveeva et al. | |
| 2009/0327179 | A1 * | 12/2009 | Strassner et al. | 706/14 |
| 2010/0257122 | A1 * | 10/2010 | Glinberg et al. | 705/36 R |
| 2010/0325126 | A1 * | 12/2010 | Rajaram et al. | 707/759 |
| 2011/0179066 | A1 * | 7/2011 | Cardno et al. | 707/769 |
| 2011/0218990 | A1 * | 9/2011 | Jordahl | 707/723 |

FOREIGN PATENT DOCUMENTS

EP   1006452 A2   6/2000

OTHER PUBLICATIONS

Thomas Ball, "An Internet Difference Engine and its Applications", 1996, IEEE, Proceedings of COMPCON '96, p. 1-6.*
Generation and Search of Clusters Files, G. Salton, et al., Cornell University, ACM Transactions on Database Systems, vol. 3, No. 4, Dec. 1978 pp. 321-346.
HVQS: The Hierarchical Visual Query System for Databases, Chen, et al., Journal of Visual Languages and Computing (2000).

* cited by examiner

*Primary Examiner* — Robert Timblin
*Assistant Examiner* — Randall Burns

(57) ABSTRACT

The hierarchical relationships between objects in different levels of an object structure (such as a contract) are stored as elements in two-dimensional matrix representations. In general, the matrix representations facilitate queries, clustering of like objects and contracts, and comparisons that identify common objects and contracts.

29 Claims, 3 Drawing Sheets

ANALYSIS OF OBJECT STRUCTURES SUCH AS BENEFITS AND PROVIDER CONTRACTS

BACKGROUND

A tremendous amount of information and data is associated with the business of providing healthcare services and benefits. For example, there are as many benefits contracts as there are clients/consumers, and many different types of contracts, with different structures, elements, and requirements. Over time, the number and types of contracts continue to increase.

The amount, complexity, and dimensionality of the information and data make it challenging to explore the relationships between contracted benefits and their impact on business and operations. The daunting nature of this challenge prevents payers from running efficient benefits and claims processing systems. Furthermore, the complexity of such systems increases the training times for benefits coders, causes inconsistencies in the construction of benefits rules, increases the lead time to market for new products (new contracts), and makes it difficult to create innovative benefits products that adequately embrace the concept of consumerism in healthcare.

Conventionally, the analysis of existing contract data requires significant manual effort and the use of multiple spreadsheets. Significant manual effort is also needed to identify the correlation between the benefits structures across various contracts and to identify all contracts with a given benefit or benefits structure. Moreover, answering questions about current benefits structures is difficult and time-consuming.

SUMMARY

Embodiments according to the present invention pertain to methods and systems for analyzing "object structures" such as contracts, in particular benefits contracts and provider (payer) contracts used in the field of healthcare. According to embodiments of the invention, complex hierarchical object relationships are mapped in terms of a series of pair-wise and connected parent-child matrix representations. Consequently, the volume of data is reduced and contract information and data can be more efficiently stored. Also, queries, searches, and comparisons can be performed readily and quickly. For example, highly correlated objects and contracts can be identified and clustered.

These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. Like numbers denote like elements throughout the drawings and specification.

DETAILED DESCRIPTION

In the following detailed description of embodiments according to the present invention, numerous specific details are set forth in order to provide a thorough understanding of those embodiments. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system such as computer system 100 of FIG. 1.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "comparing," "identifying," "using," "displaying," "receiving," "filtering," "presenting," "assembling," "evaluating," or the like, may refer to the actions and processes of a computer system (e.g., flowchart 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Figure 1:
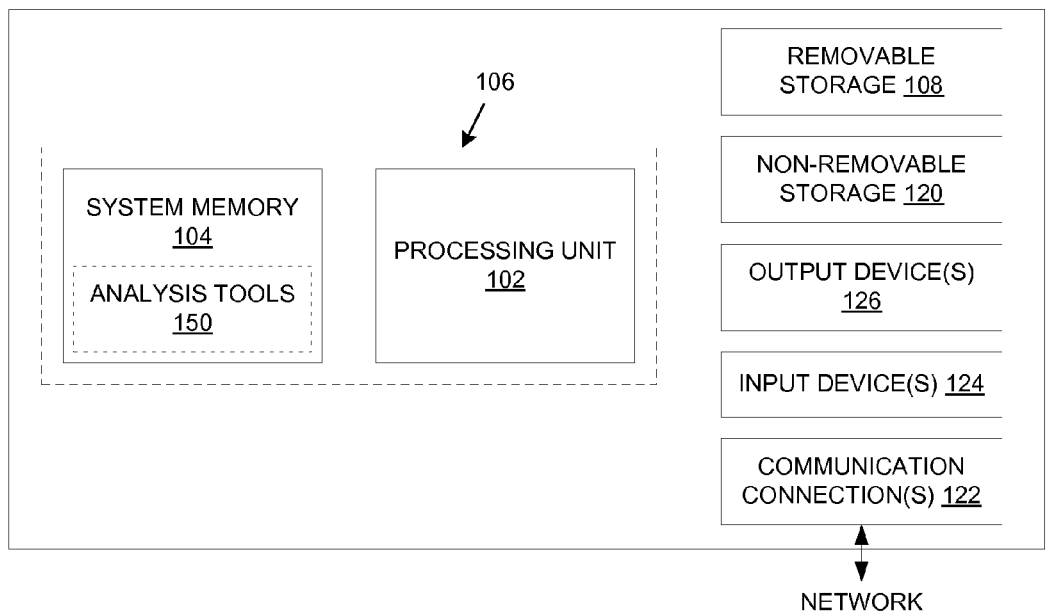
FIG. 1 is a block diagram of an example of a computer system upon which embodiments of the present invention can be implemented.

FIG. 1 shows a block diagram of an example of a computer system 100 upon which the embodiments described herein may be implemented. In its most basic configuration, the system 100 includes at least one processing unit 102 and memory 104. This most basic configuration is illustrated in FIG. 1 by dashed line 106. The system 100 may also have additional features/functionality. For example, the system 100 may also include additional storage (removable and/or non-removable) including, but not limited to, magnetic or optical disks or tape. Such additional storage is illustrated in FIG. 1 by removable storage 108 and non-removable storage

120. The system 100 may also contain communications connection(s) 122 that allow the device to communicate with other devices.

Generally speaking, the system 100 includes at least some form of computer-usable media. Computer-usable media can be any available media that can be accessed by the system 100. By way of example, and not limitation, computer-usable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed by the system 100. Any such computer storage media may be part of the system 100. The memory 104, removable storage 108 and non-removable storage 120 are all examples of computer storage media.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media. The communications connection(s) 122 is/are an example of communication media.

The system 100 may also have input device(s) 124 such as keyboard, mouse, pen, voice input device, touch input device, etc. Output device(s) 126 such as a display, speakers, printer, etc., may also be included.

The system 100 may operate in a networked environment using logical connections to one or more remote computers. When used in a networking environment, the system 100 can be connected to the network through the communication connection(s) 122.

In the example of FIG. 1, the memory 104 includes computer-readable instructions, data structures, program modules, and the like associated with analysis tools 150. However, the analysis tools 150 may instead reside in any one of the computer storage media used by the system 100, or may be distributed over some combination of the computer storage media, or may be distributed over some combination of networked computers. Elements and functionalities associated with the analysis tools 150 are described further in conjunction with FIGS. 2, 3, and 4.

Figure 2:
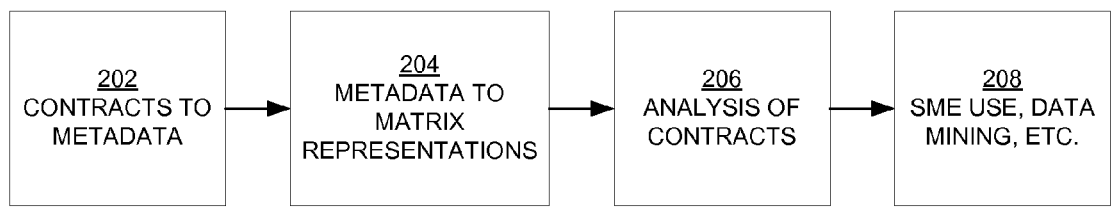
FIG. 2 is a block diagram of functionalities associated with analysis tools according to embodiments of the invention.

FIG. 2 is a block diagram that provides an overview of some of the functionalities associated with the analysis tools 150 according to embodiments of the invention. In block 202, object structures such as contracts are decomposed into metadata.

In general, a contract includes a hierarchical arrangement of objects. For example, a contract will include various sections each identified by a heading, each section may include subsections identified by subheadings, and so on. Furthermore, a contract may be separated into different categories, and within each category there may be a hierarchical arrangement of different rules, benefit types, service types, procedure codes, and so on. Each of those elements—the contract, headings, sub-headings, categories, rules, etc.—corresponds to an object associated with the contract, and there is a hierarchical relationship between those objects.

Thus, more specifically, in block 202 each unique object in each of the contracts being evaluated is identified and associated with a unique value (a unique number or index). In other words, each object can be uniquely identified by a number/index.

In block 204, the object structures (e.g., the contracts) are transformed into metadata tables that can be represented as two-dimensional matrixes. More specifically, an individual two-dimensional matrix can be generated for each level of detail in the contracts. Each matrix pair-wise maps an object in one level of the object hierarchy to an object in another level of the object hierarchy. For example, a matrix can be generated that maps the categories contained in each contract to the contracts—the matrix will contain a row for each contract, and a column for each category. Similarly, another matrix can be generated that maps the rules in each category to the categories—that matrix will contain a row for each category, and a column for each rule. Other matrixes that map objects in one level to objects in another level can be similarly generated.

The name associated with each row and the name associated with each column are referred to herein as matrix elements, while the items in the contracts that are represented by the matrix elements are referred to as objects as in the preceding discussion. The matrix elements can each be identified using the unique indexes referred to above.

If the order of the elements in the matrixes does not matter, then the presence of an element in a matrix can be represented by simply entering a "1" at the appropriate point in the matrix. In other words, if category-1 is present in contract-1, then a "1" can be entered at the intersection of the column corresponding to category-1 and the row corresponding to contract-1. Consequently, if the order of the elements does not matter, then the matrixes can be transformed into and stored as sparse matrixes, thus significantly reducing the volume of stored data.

If the order of the elements in the matrixes does matter, then the matrixes can be stored as sets of ordered pairs, which also reduces the volume of stored data although not as much relative to the use of sparse matrixes.

Generally speaking, in blocks 202 and 204, text-based objects are represented as matrixes; conversely, matrixes are used for text storage and subsequent retrieval. In general, by storing contracts and objects in matrix form using indexes to represent the objects, the volume of stored data is reduced.

In block 206, the contracts can be evaluated in different ways, facilitated by the matrix representations of the information in those contracts. Conventionally, evaluations of contracts are performed using a series of SQL (Structured Query Language) queries of a relational database that contains contracts data. Such queries can be time-consuming and resource-intensive. According to embodiments of the invention, contracts evaluations are more efficiently performed by executing what are essentially table lookups that entail traversing the various matrix representations of the contracts data to search for and/or retrieve specific information, and then manipulating that information depending on the type of evaluation being performed.

The types of evaluations that can be performed include comparing contracts to identify common objects as well as differences, and/or to identify interesting relationships across contracts and the variables they contain. Correlated contracts can be identified and clustered for further evaluation. Contracts can be compared to a standard or model contract (e.g., a template) to identify similarities and differences. Commonly used objects can be identified and assembled into new products. Queries and searches of individual contracts or groups of contracts can be performed to efficiently answer questions about benefits and the benefits structure.

The analysis tools 150 can also be used for "rule mapping," to perform rule discovery on any set of objects (e.g., benefits, claim data). More specifically, the conditions of the contract can be stored as a sequence of if/then (include/exclude) statements so that a mapping between each object and the applicable benefit rules can be automatically produced. Each if/then statement provides direction on how to process a claim based on supplementary claim line details that might impact payment of the claim (examples include the age of the patient and the type of specialist performing the procedure). The if/then statements can then be expanded into a series of "rule paths"—logical possibilities for how a claim may pass through rules processing before reaching a final result. The rule paths may also be prioritized based on those that should be considered first. This provides automation of the possible outcomes of any given set of claim data, including claim adjudication codes (reject, suspend, pay, etc.) and cost sharing considerations (e.g., coinsurance, copay, etc.), where the necessary conditions to reach the result are defined by the rules that constitute each path. The rule mapping capability just described can be used to determine, for any set of data that may be in a claim, how claims are handled by a claims processing system without having to test every possible claim ahead of time. Also, claim 1aim 1nformation for claims that follow the same rule path or that lead to the same result can be grouped so that rules associated with that information can be extracted; this can be used to identify, for example, similar services that are associated with a group of claim 1aim 1nformation. Furthermore, the rule mapping capability can be used to select any item of information in a claim and determine which rules are processed against that item.

The analysis tools 150 also can be used for "rule replacement," to modify contract rule data according to user-specified patterns. Operations include: 1) direct modification of an existing rule, 2) removal of an existing rule, 3) removal of a portion of an existing rule, or 4) addition to an existing rule. The user provides a mapping between existing data and the intended modification. For example, the user may direct the tools to look for rules that specify patient age in general, or a specific age in particular, and to perform one of the operations listed above on the rules that are found. Data transformations can be performed automatically, and the newly formatted rule can then be displayed.

In block 208, subject matter experts (SMEs) can interact with the analysis tools 150 for a variety of purposes, depending on their area of interest. For example, software engineering SMEs can interact with the analysis tools 150 to refine and further develop those tools, while healthcare SMEs can interact with the tools to develop model contracts and to efficiently handle benefits and claims processing. Impact analyses can also be performed. For example, the impact of a potential change can be determined by identifying how many clients would be affected by the change and in what manner. Furthermore, results and data can be exported to other tools.

Figure 3:
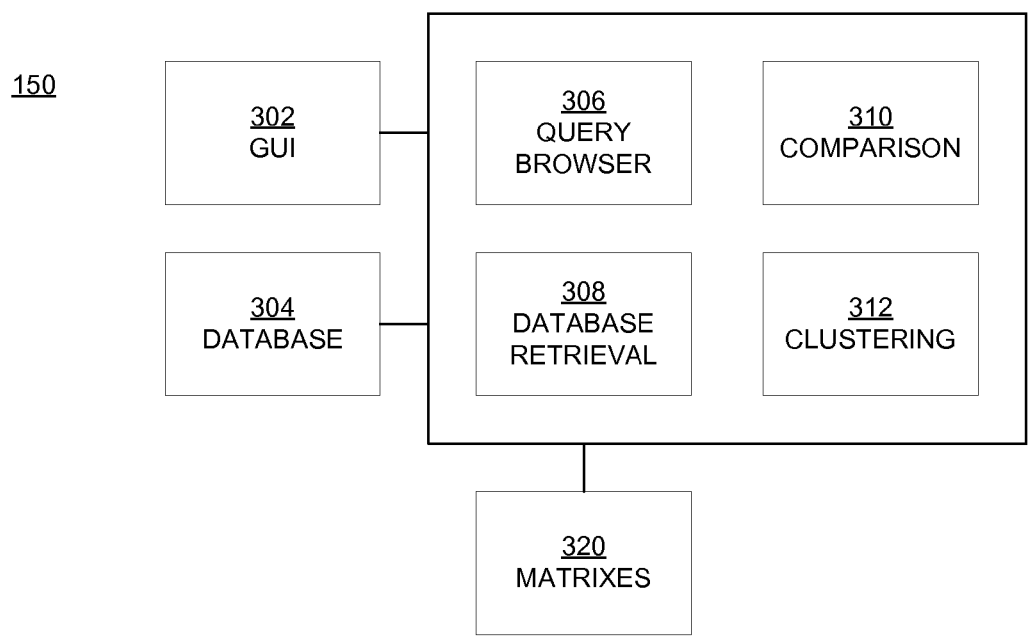
FIG. 3 is a block diagram illustrating elements of analysis tools according to an embodiment of the invention.

FIG. 3 is a block diagram illustrating elements of the analysis tools 150 according to an embodiment of the invention. In the example of FIG. 3, the analysis tools include a graphical user interface (GUI) 302, a source database 304, a query browser component 306, a database retrieval component 308, a comparison component 310, a clustering component 312, and a database 320 that includes the transformed data (e.g., matrix representations of the objects and data in the database 304).

In one embodiment, the analysis tools 150 are implemented as computer-executable components stored in a computer-usable/computer-readable medium. Although represented in FIG. 3 as separate components, the analysis tools 150 effectively is an integrated tool capable of providing the overall functionality about to be described.

The database 304 represents one or more legacy relational databases. In other words, the analysis tools 150 can operate on conventional databases. The database 304 also represents different sources of data. In other words, data can be imported into the analysis tools 150 from multiple databases (e.g., member and client databases).

The database retrieval component 308 operates to retrieve and evaluate contracts data and information from the database 304, and transform that data and information into metadata as previously described herein. In one embodiment, a series of SQL queries are executed to extract objects and develop the connections between the various levels of detail (the various levels of the object hierarchy) as discussed above. The results of those queries are recorded and then formed into matrix representations 320 as discussed above. Generally speaking, the database retrieval component 308 transforms text-based information (e.g., objects in contracts) into a matrix format to save space during storage, and to save run time during retrieval and analysis.

The query browser component 306 is useful for searches, queries, and the like. A user can input search conditions via the GUI 302, and those search conditions can be used to filter the matrix representations 320. In one embodiment, in response to a query or search, selected matrix representations 320 are converted into lookup tables in order to accommodate high-speed lookups based on the search conditions. Other techniques can be utilized to search the matrix representations.

The query browser function can be used to slice the population of contracts into different groups depending on user-specified search conditions. For example, contracts can be stratified based on production distribution (e.g., percent preferred provider organization versus health maintenance organization, etc.), group size distribution, major headings in the contract, or any other variable or combination of variables of interest to a user (e.g., SME). The query browser function can also be used to perform the rule mapping and rule replacement functions described previously herein.

The matrix representations 320 also lend themselves to comparison evaluations and clustering evaluations by the comparison component 310 and the clustering component 312, respectively. A particular contract can be used as the basis for comparison; the particular contract may be a standard or model contract. Contracts evaluated by the comparison component 310 can be identified along with information that indicates the degree to which those contracts match the model contract. Alternatively, only the contracts with a degree of match that satisfies a user-specified comparison threshold may be identified and presented.

Comparisons can be performed at or across any level of detail (level in the object hierarchy), and comparison results can be presented for any level of detail. Results in addition to the degree of match can also be provided. For example, objects that contracts have in common can be presented via GUI 302, and objects included in one or more contracts but not in another can also be presented. Also, objects that match at one level of detail but do not match at another level of detail can be presented. For example, two contracts may each provide ambulance services, but the conditions attached to that service may be different.

The comparison results can be presented in a variety of different formats. The results can be presented in list form, for example, with visual cues (e.g., color coding) to indicate objects that match, objects that are different, or objects present in at least one contract but absent from another.

The clustering (or correlation) component 312 can be used to identify and sort (cluster) contracts that satisfy a correlation threshold that is specified by a user. Thus, contracts that correlate to a degree that satisfies a user-specified correlation threshold can be found and identified. In other words, if the correlation threshold is 80%, for example, then contracts that correlate with the model contract by at least 80% are found and identified. The contracts in a cluster may be used as the basis for developing a new contract model.

In many situations, it may be useful to execute the clustering function in combination with the comparison function. Thus, a subset of contracts that highly correlate (that satisfy a correlation threshold) is identified first. Then, the comparison function is performed using only that subset.

Correlation results can be presented graphically using any of a variety of different visualization techniques. A color-coded heat map can be used, for example. Alternatively, the order of the elements in a matrix representation can be changed to reflect the correlation results. For example, the highest-level matrix representation (the matrix that includes contracts as row elements) can be reordered so that the elements are ranked in order of their degree of correlation. In other words, contracts that correlate highly will be clustered together in the matrix when the matrix is displayed.

Other types of techniques for visualizing data to enhance sense-making can be used. These techniques include, but are not limited to, cluster analysis (clustering), link arrays, and geographic information system (GIS) overlays. With cluster analysis, correlation results that are similar in some manner are clustered when displayed. For example, a graphical element (e.g., an icon) representing a contract will be displayed in proximity to an icon representing another contract that correlates to the first contract, with the distance between the two contracts representing the degree of correlation (a smaller distance represents a higher degree of correlation). Link arrays represent (display) chosen properties as different planes with links (lines) connecting the planes to indicate relationships between the information in the planes. Each plane may represent a different contract, a different level in the object hierarchy, or a different object that appears across contracts, for example. GIS overlays render information based on properties such as geographic location or demographics, for example.

In general, the analysis tools 150 incorporate different ways of representing information (e.g., objects, correlation results, etc.) that allow humans to intuitively and quickly understand and interpret large amount of information and the relationships in that information.

The correlation function is useful for identifying objects that are not in all contracts as well as objects that are in all contracts. The objects present in all contracts (or a specified number of contracts, such as a large majority of the contracts) can serve as building blocks for constructing new contracts and products. Thus, the correlation function can be useful for developing a model or standard contract/product. Accordingly, the time needed to develop a new contract/product can be greatly reduced.

To summarize, the analysis tools 150 can be used to systematically highlight contract correlations. For example, the tools can be used to identify the percentage of contracts that are highly correlated, and the amount of variation accounted for by the remaining contracts. The analysis tools 150 can also be used to automate the discovery of the correlation between contracts at lower level objects (at relatively low levels of the hierarchy of contract objects). Furthermore, the analysis tools 150 can visually represent information and results from the analysis that information in meaningful ways that are quickly and intuitively understood and interpreted.

The analysis tools 150 can also be used to systematically identify contracts, or objects (e.g., benefits, features, etc.) in those contracts, that are not in current use. Also, the tools can be used to automate the discovery of contracts that provide essentially the same benefits, perhaps differing only by values associated with lower level features and variables (as in the ambulance service example mentioned above). In addition, the analysis tools 150 can be used to quickly consolidate benefits structures from multiple sources into a single, consolidated contract. Each of these capabilities provides the opportunity to reduce the overall number of contracts and/or streamline claims and benefits processing systems.

Furthermore, the analysis tools 150 can be used to identify potential anomalies, outliers, and conflicts across contracts and their terms, features, etc. Other uses for the analysis tools 150 include data mining and mapping of legacy contracts to existing contracts (e.g., for migration from one claims and benefits processing system to another).

Thus, embodiments according to the present invention can be used to map complex, hierarchical benefit-object relationships in terms of a series of pair-wise parent-child matrixes, with mapping between the matrixes to facilitate different types of analyses. Highly correlated objects can be searched for and identified. Building blocks in multiple levels of the hierarchy can be identified so that higher-order objects and contracts can be constructed in terms of the building blocks.

Figure 4:
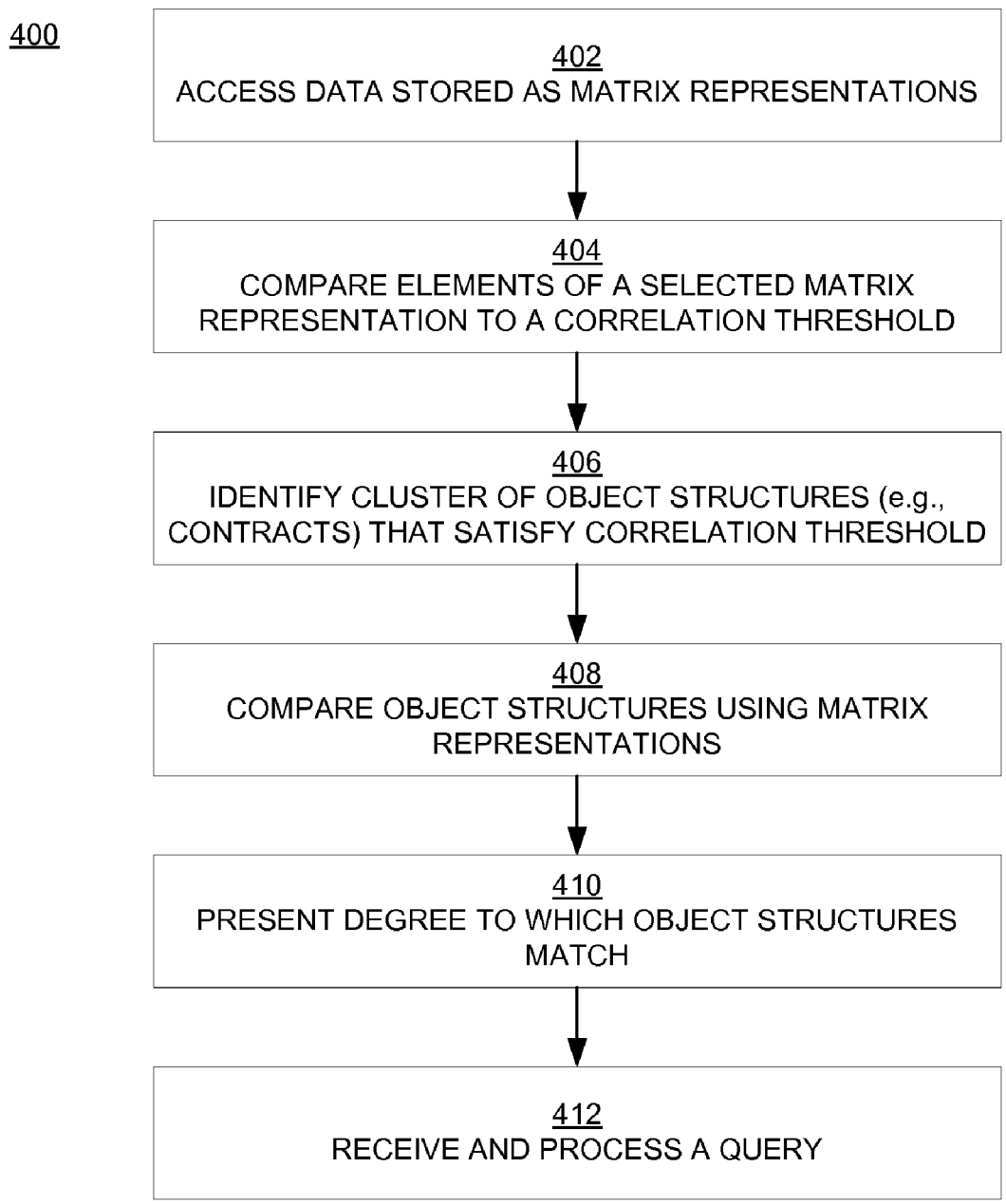
FIG. 4 is a flowchart summarizing methods for analyzing object structures according to an embodiment of the invention.

FIG. 4 is a flowchart 400 summarizing methods for analyzing object structures such as contracts, particularly benefits and provider contracts in the healthcare field. Although specific steps are disclosed in the flowchart 400, such steps are examples only. That is, various other steps or variations of the steps recited in the flowchart 400 can be performed. The steps in the flowchart 400 may be performed in an order different than presented. In one embodiment, the flowchart 400 is implemented as computer-readable instructions stored in a computer-usable medium.

In block 402, data that represents the hierarchy of information included in different object structures (e.g., contracts) is accessed. In one embodiment, the data is stored as a series of two-dimensional matrix representations, with each of the matrix representations storing pair-wise connections between objects from one level of the hierarchy of information (e.g., a first level, where "first" is used as a distinguishing term and does not necessarily imply the highest or lowest level of the hierarchy) and objects from another level of the hierarchy (e.g., a second level, where "second" is used as a distinguishing term and does not necessarily imply a level adjacent to the first level).

In block 404, elements of a selected matrix representation are compared to a correlation threshold.

In block 406, a cluster of the object structures is identified and presented, where the object structures in the cluster are each associated with elements of the selected matrix representation that satisfy the correlation threshold. In one embodiment, elements of the selected matrix representation are presented (e.g., displayed) in an order that is based on their degree of correlation. In another embodiment, a color-coded heat map is used. In yet other embodiments, visualization techniques such as cluster arrays, link arrays, and GIS overlays are used.

In block 408, object structures are compared to each other. More specifically, elements of a selected matrix representation are compared to one another. In one embodiment, object structures in the aforementioned cluster are compared to each other. In other words, the correlation tool is applied first to identify a subset of correlated contracts, and the comparison tool is then applied to that subset. In one embodiment, object structures are compared to a standard or model.

In one embodiment, building blocks that are made up of elements that share a specified degree of commonality are assembled. The building blocks can in turn be used to assemble a new contract.

In block 410, the degree to which the compared object structures match each other is presented. In one embodiment, object structures that match to a degree that satisfies a comparison threshold are identified. In one embodiment, different types of visual cues are used to distinguish between objects that match other objects, objects that do not match other objects, and objects that are absent from at least one of the object structures.

In block 412, a query that specifies a set of search conditions is received. In response to the query, data is filtered to identify object structures or objects that satisfy the search conditions. The search can be narrowed by selecting one of the objects included in the search results; in effect, this adds another search condition.

In summary, embodiments according to the present invention provide methods and systems for analyzing object structures such as contracts, in particular benefits contracts and provider (payer) contracts used in the field of healthcare. According to embodiments of the invention, complex hierarchical object relationships are mapped in terms of a series of pair-wise and connected parent-child matrix representations. Consequently, the volume of data is reduced and contract information and data can be more efficiently stored. Also, queries, searches, and comparisons can be performed readily and quickly.

Accordingly, payers can improve the efficiency of benefits and claims processing systems, which can result in reduced training times for benefits coders. Benefits rules can be constructed more consistently, and the lead time to market for new products (e.g., new contracts) can be reduced.

The effort needed for analysis of existing contract data, to identify the correlation between the benefits structures across various contracts, and to identify all contracts with a given benefit or benefits structure is reduced. Moreover, the process for answering questions about current benefits structures is streamlined.

Although described in the context of healthcare products and services, embodiments according to the invention are not so limited, and may be applied in other fields.

The foregoing descriptions of specific embodiments according to the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A non-transitory computer storage medium having computer-readable program code embodied therein for causing a computer system to perform operations comprising:
   accessing data that represents information included in a plurality of different contracts, wherein information included in each of said contracts is arranged in a multi-level hierarchy, wherein said data is stored as matrix representations comprising a first plurality of two-dimensional matrix representations and a second plurality of two-dimensional matrix representations, each of said matrix representations in said first plurality storing pair-wise connections between objects from a first level of said hierarchy and objects from a second level of said hierarchy, and each of said matrix representations in said second plurality storing pair-wise connections between objects from said second level and objects from a third level of said hierarchy;
   comparing elements of a first matrix representation selected from said matrix representations to a correlation threshold; and
   identifying a cluster of said contracts associated with elements of said first matrix representation that satisfy said correlation threshold.

2. The non-transitory computer storage medium of claim 1 wherein said operations further comprise:
   comparing contracts to each other; and
   identifying contracts that match each other to a degree that satisfies a comparison threshold.

3. The non-transitory computer storage medium of claim 1 wherein said operations further comprise:
   comparing contracts to a standard contract; and
   identifying contracts that match said standard contract to a degree that satisfies a comparison threshold.

4. The non-transitory computer storage medium of claim 3 wherein said operations further comprise using different types of visual cues to distinguish between objects in a contract that match objects in said standard contract, objects in said contract that do not match objects in said standard contract, and objects that are absent from said contract in comparison to said standard contract.

5. The non-transitory computer storage medium of claim 1 wherein said operations further comprise an operation selected from the group consisting of: displaying elements of said first matrix representation in an order based on their degree of correlation; and displaying a graphical view comprising a color-coded heat map of said first matrix representation.

6. The non-transitory computer storage medium of claim 1 wherein said operations further comprise displaying information associated with said contracts in a format selected from the group consisting of: a cluster array; a link array; and a graphical information system overlay.

7. The non-transitory computer storage medium of claim 1 wherein said first matrix representation comprises a sparse matrix.

8. The non-transitory computer storage medium of claim 1 wherein said operations further comprise:
   receiving a query that specifies a set of search conditions; and
   filtering data to identify said plurality of contracts, wherein said plurality of contracts comprises contracts that satisfy said search conditions.

9. The non-transitory computer storage medium of claim 8 wherein said operations further comprise:
   receiving a selection of an object included in a contract of said plurality of contracts; and in response to receiving said selection, filtering data representing said plurality of contracts to identify other contracts that include said object.

10. A non-transitory computer storage medium having computer-executable components comprising analysis tools, said components comprising:
a query browser tool configured to access data that represents information included in a plurality of different contracts, wherein information included in each of said contracts is arranged in a multi-level hierarchy, wherein said data is stored as matrix representations comprising a first plurality of pair-wise parent-child matrix representations that map connections between an object from a first level of said hierarchy and an object from a second level of said hierarchy, wherein said matrix representations further comprise a second plurality of pair-wise parent-child matrix representations that map connections between an object from said second level and an object from a third level of said hierarchy, said query browser tool also configured to filter said data based on specified search conditions;
a clustering tool coupled to said query browser tool and configured to compare elements of a first matrix representation selected from said matrix representations to a correlation threshold to identify a cluster of said contracts associated with elements of said first matrix representation that satisfy said correlation threshold; and
a comparison tool coupled to said query browser tool and configured to compare said contracts to identify a degree of match between said contracts.

11. The non-transitory computer storage medium of claim 10 wherein said comparison tool is configured to compare said contracts to each other and to compare said contracts to a standard contract, wherein said clustering tool is further configured to present different types of visual cues to distinguish between objects in said contracts that match objects in said standard contract, objects in said contracts that do not match objects in said standard contract, and objects that are absent from said contracts in comparison to said standard contract.

12. The non-transitory computer storage medium of claim 10 wherein said clustering tool is further configured to perform an operation selected from the group consisting of: displaying elements of said first matrix representation in an order based on their degree of correlation; and displaying a graphical view comprising a color-coded heat map of said first matrix representation.

13. The non-transitory computer storage medium of claim 10 wherein said clustering tool is further configured to display information associated with said contracts in a format selected from the group consisting of: a cluster array; a link array; and a graphical information system overlay.

14. The non-transitory computer storage medium of claim 10 wherein said analysis tools are further configured to perform rule mapping, said rule mapping comprising representing conditions of a contract as if/then statements and using said if/then statements to identify a rule path that defines a result for a claim against said contract according to information in said claim.

15. The non-transitory computer storage medium of claim 10 wherein said analysis tools are further configured to perform rule replacement, said rule replacement comprising modifying a rule in a contract that is selected according to a user-specified pattern.

16. A computer-implemented method comprising:
accessing data that represents a information included in a plurality of different contracts, wherein information included in each of said contracts is arranged in a multi-level hierarchy, wherein said data is stored as matrix representations comprising a first plurality of two-dimensional matrix representations and a second plurality of two-dimensional matrix representations, each of said matrix representations in said first plurality storing pair-wise connections between objects from a first level of said hierarchy and a second level of said hierarchy, and each of said matrix representations in said second plurality storing pair-wise connections between objects from said second level and objects from a third level of said hierarchy of said hierarchy, wherein row identifiers in a first matrix representation of said first plurality are used as column identifiers in a second matrix representation of said second plurality;
identifying building blocks comprising elements of said matrix representations that share a specified degree of commonality; and
assembling a new contract based on said building blocks.

17. The method of claim 16 further comprising:
evaluating said contracts to identify contracts that match each other to a degree that satisfies a comparison threshold; and
identifying objects in said contracts that match, objects in said contracts that do not match, and objects that are absent from at least one of said contracts.

18. The method of claim 16 further comprising:
comparing elements of a first matrix representation selected from said matrix representations to a correlation threshold; and
identifying contracts associated with elements of said first matrix representation that satisfy said correlation threshold.

19. The method of claim 16 further comprising:
receiving a query that specifies a set of search conditions; and
filtering said data to identify objects that satisfy said search conditions.

20. The method of claim 19 further comprising:
receiving a selection of an object that satisfies said search conditions; and
in response to receiving said selection, identifying other contracts that include said object.

21. A computer system comprising:
a processing unit; and
a memory coupled to said processing unit, said memory having stored thereon computer-executable instructions that when executed cause said computer system to perform operations comprising:
accessing data that represents information included in a plurality of different contracts, wherein information included in each of said contracts is arranged in a multi-level hierarchy, wherein said data is stored as matrix representations comprising a first plurality of two-dimensional matrix representations and a second plurality of two-dimensional matrix representations, each of said matrix representations in said first plurality storing pair-wise connections between objects from a first level of said hierarchy and objects from a second level of said hierarchy, and each of said matrix representations in said second plurality storing pair-wise connections between objects from said second level and objects from a third level of said hierarchy;
comparing elements of a first matrix representation selected from said matrix representations to a correlation threshold; and identifying a cluster of said contracts associated with elements of said first matrix representation that satisfy said correlation threshold.

22. The computer system of claim 21 wherein said operations further comprise:
    comparing contracts to each other; and
    identifying contracts that match each other to a degree that satisfies a comparison threshold.

23. The computer system of claim 21 wherein said operations further comprise:
    comparing contracts to a standard contract; and
    identifying contracts that match said standard contract to a degree that satisfies a comparison threshold.

24. The computer system of claim 21 wherein said first matrix representation comprises a sparse matrix.

25. The computer system of claim 21 wherein said operations further comprise:
    receiving a query that specifies a set of search conditions; and
    filtering data to identify said plurality of contracts, wherein said plurality of contracts comprises contracts that satisfy said search conditions.

26. A computer system comprising:
    a processing unit; and
    a memory coupled to said processing unit, said memory having stored thereon computer-executable instructions that when executed cause said computer system to perform operations comprising:
        accessing data that represents a information included in a plurality of different contracts, wherein information included in each of said contracts is arranged in a multi-level hierarchy, wherein said data is stored as matrix representations comprising a first plurality of two-dimensional matrix representations and a second plurality of two-dimensional matrix representations, each of said matrix representations in said first plurality storing pair-wise connections between objects from a first level of said hierarchy and a second level of said hierarchy, and each of said matrix representations in said second plurality storing pair-wise connections between objects from said second level and objects from a third level of said hierarchy of said hierarchy, wherein row identifiers in a first matrix representation of said first plurality are used as column identifiers in a second matrix representation of said second plurality;
        identifying building blocks comprising elements of said matrix representations that share a specified degree of commonality; and
        assembling a new contract based on said building blocks.

27. The computer system of claim 26 wherein said operations further comprise:
    evaluating said contracts to identify contracts that match each other to a degree that satisfies a comparison threshold; and
    identifying objects in said contracts that match, objects in said contracts that do not match, and objects that are absent from at least one of said contracts.

28. The computer system of claim 26 wherein said operations further comprise:
    comparing elements of a first matrix representation selected from said matrix representations to a correlation threshold; and
    identifying contracts associated with elements of said first matrix representation that satisfy said correlation threshold.

29. The computer system of claim 26 wherein said operations further comprise:
    receiving a query that specifies a set of search conditions; and
    filtering said data to identify objects that satisfy said search conditions.

* * * * *